UNITED STATES PATENT OFFICE.

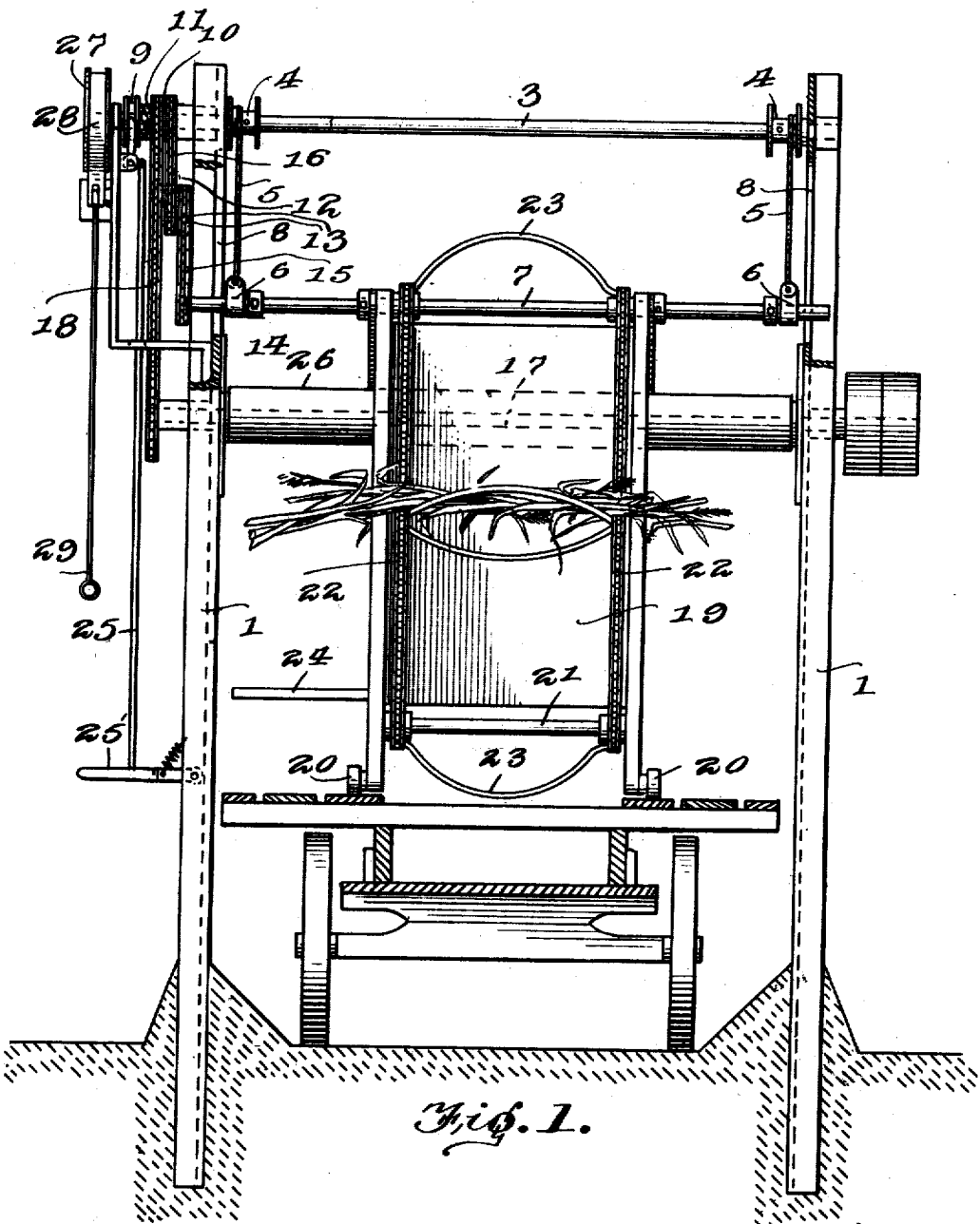

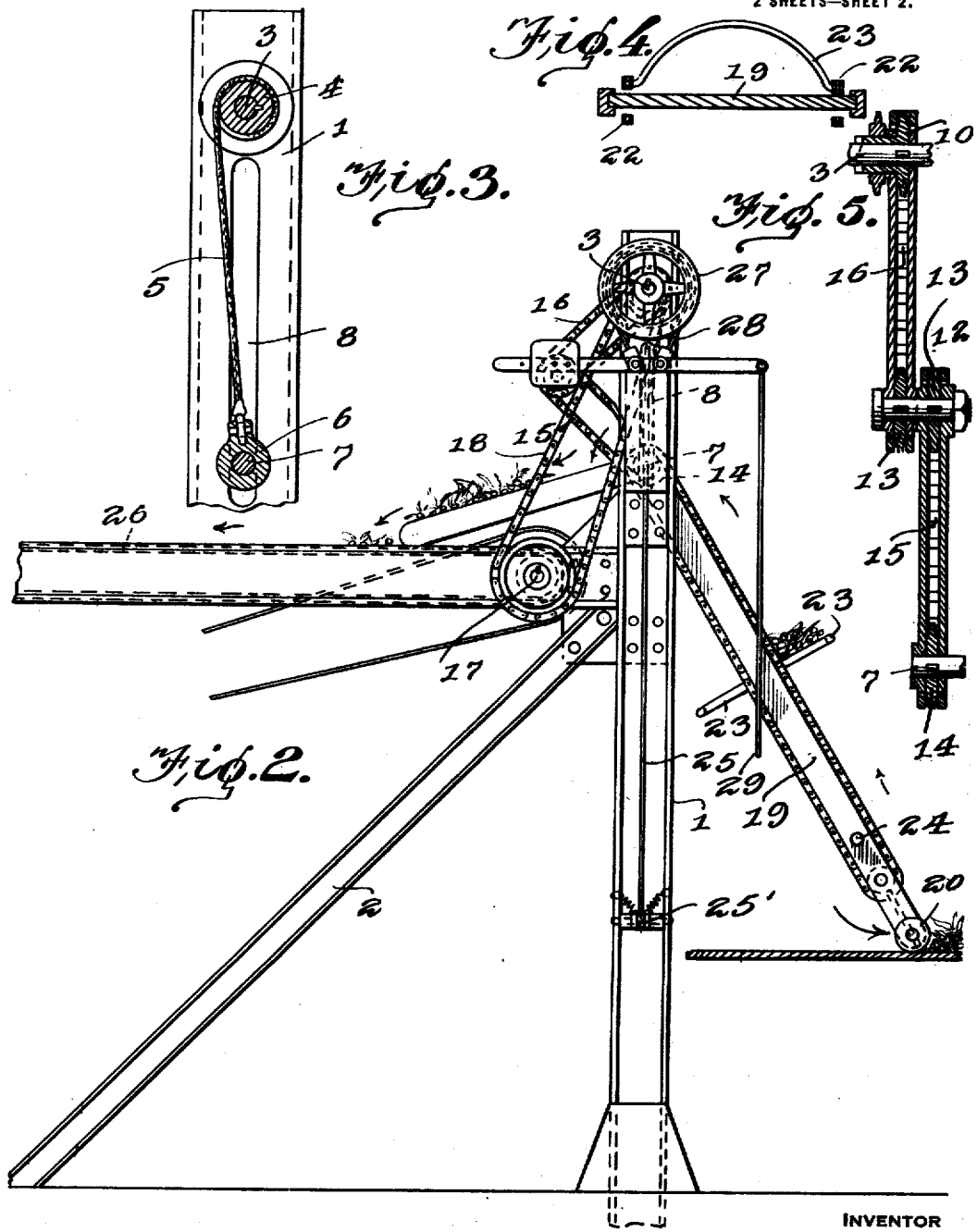

EDWIN W. COOTS, OF SHELBYVILLE, KENTUCKY.

UNLOADING APPARATUS.

1,267,187.   Specification of Letters Patent.   Patented May 21, 1918.

Application filed November 14, 1916. Serial No. 131,311.

*To all whom it may concern:*

Be it known that I, EDWIN W. COOTS, a citizen of the United States, residing at Shelbyville, in the county of Shelby and State of Kentucky, have invented new and useful Improvements in Unloading Apparatus, of which the following is a specification.

This invention relates to improvements in unloading apparatus and has particular application to apparatus for unloading corn stalks and the like from wagons and delivering the same to a traveling table whence the material may be delivered to the cutter.

In carrying out the present invention it is my purpose to provide an unloading apparatus of the class described wherein the conveyer may be lowered into engagement with the wagon carrying the corn and operated to remove the material from the wagon and deliver the same to the traveling table, and wherein the lower end of the conveyer may be moved manually along the wagon bed so as to be at all times in engagement with the material in the wagon thereby enabling the wagon to be completely unloaded.

It is also my purpose to provide an unloading apparatus of the type set forth wherein the driving mechanism for the conveyer will be of a flexible nature so as to effectively drive the conveyer at all times irrespective of the movement of the conveyer along the wagon bed to gather the material in the wagon.

With the above recited objects in view and others of a similar nature, the invention consists in the construction, combination and arrangement of parts set forth in and falling within the scope of the appended claim.

In the accompanying drawings:

Figure 1 is a front elevation of the apparatus showing the operative position of the conveyer with respect to a wagon bed.

Fig. 2 is a side elevation.

Fig. 3 is a fragmentary elevation of one of the standards and several of its associated parts.

Fig. 4 is a transverse sectional view through the conveyer.

Fig. 5 is a sectional view showing the arrangement of certain of the sprockets and driving chains.

Referring now to the drawings in detail 1—1 designates uprights having the lower extremities thereof embedded in the earth, or secured to some other suitable support.

The lower ends of these uprights are preferably although not necessarily braced by suitable brace bars 2, while journaled in the upper ends of the uprights is a horizontal shaft 3 and fixed upon the shaft 3 adjacent to the inner sides of the respective uprights are drums 4. Connected to the drums 4 and wrapped thereabout are the corresponding ends of cables 5 or other flexible elements. Secured to the lower ends of the cables 5 are bearings 6 respectively, and journaled in these bearings 6 is a horizontal shaft 7 having one end projecting through an elongated vertical slot 8 formed in the adjacent upright 1. One end of the shaft 3 projects beyond the adjacent upright and splined upon such end of the shaft 3 is a clutch collar 9, while loosely mounted upon the projecting end of said shaft is a duplex sprocket wheel 10 having one end thereof formed to provide a clutch member 11 adapted to be engaged by the clutch 9 to fasten the duplex sprocket wheel to the shaft 3 so that the latter may be rotated upon the rotation of the sprocket wheel. 12 designates a sprocket having one end mounted upon the outer extremity of the shaft 7 and the other end mounted upon the projecting end portion of the shaft 3 adjacent to the sprocket wheel 10. Rotatably mounted upon the toggle link structure 12 at the pivotal connection between the links of such structure are sprocket wheels 13, while keyed upon the projecting end of the shaft 7 is a sprocket wheel 14, and trained over the sprocket wheel 14 and the corresponding wheel 13 is an endless chain 15, while trained over the other sprocket wheel 13 and the corresponding sprocket of the duplex wheel 10 is an endless chain 16. Trained over the remaining wheel of the duplex sprocket 10 and a sprocket wheel on a shaft 17 is an endless chain 18. The shaft 17 may be driven from the cutter mechanism or by any other suitable source of power. Lastly mounted upon the shaft 7 and depending therefrom is a frame 19 of appropriate construction and journaled in the lower end of the frame 19 are bearing rollers 20 adapted to engage the bed of the wagon in the unloading of the latter. Journaled in the frame 19 adjacent to the lower extremity thereof is a shaft 21 and trained over suitable wheels on the shaft 21 and the shaft 7 are belts 22 spaced in parallelism and constituting a conveyer. These belts 22 carry grab hooks 23 arranged transversely of the belts and adapted, in the operation of the conveyer, to carry the material out of the wagon. The frame 19 is equipped with a hand lever 24 whereby the lower end of the frame may be moved along the bottom or bed of the wagon in order that the grab hooks 23 will at all times engage the material in the wagon so that such material may be unloaded, while the clutch 9 is connected through suitable lever and link mechanism 25 with an operating lever 25' pivoted upon one of the uprights 1 and arranged in proximity to the lever 24 so that both levers will be within convenient reach of the operator or attendant of the unloader.

26 designates a horizontally disposed traveling table arranged adjacent to the shaft 7 and in juxtaposition to the discharge end, that is the upper end, of the conveyer and this traveling table leads to the cutter so that the stalks of corn may be carried from the conveyer to the cutting machine.

Fixed upon the shaft 3 is a brake drum 27 and surrounding the brake drum is a brake band 28 under the control of a hand lever 29 arranged adjacent to the levers 25' and 24.

In practice the wagon to be unloaded is drawn between the uprights 1 to a position below the conveyer, and the brake drum 27 relieved of the influence of the band 28 so that the conveyer may descend under the action of gravity the cables 5 unwinding from the drums 4 in the downward movement of the conveyer. When the lower end of the conveyer is in engagement with the wagon bed the brake band 28 is tightened upon the drum 27 to check the downward movement of the conveyer. In the downward movement of the shaft 7 the toggle link structure 12 expands or opens so as to maintain a driven connection between the duplex sprocket wheel and the shaft 7. The shaft 17 is now connected up with the source of power and motion transmitted to the chain 18 to the duplex sprocket wheel 10 and from the duplex sprocket wheel through the chains 16 and 15 and their corresponding sprocket wheels to the shaft 7 thereby operating the conveyer. In the operation of the conveyer the grab hooks 23 carry the material out of the wagon and deliver the same onto the table 26, and the table, in turn, delivers the material to the cutter. As the material is unloaded from the wagon the lower end of the conveyer is moved over the bottom of the wagon by the action of the lever 24 until all of the material is taken from the wagon.

After the wagon has been unloaded the clutches 9 and 11 are engaged so that the shaft 3 will be rotated to wind the cables 5 upon the drums 4 and so elevate the shaft 7 and the conveyer mechanism carried thereby whereby the wagon may be withdrawn from the position beneath the conveyer and a loaded wagon moved in the position below the conveyer.

While I have herein shown and described one preferred form of my invention by way of illustration, I wish it to be understood that I do not limit or confine myself to the precise details of construction herein shown and described, as modification and variation may be made within the scope of the claim and without departing from the spirit of the invention.

I claim:—

An unloading apparatus, comprising slotted parallel uprights, an operating shaft journaled in the uprights above the slotted portions, a lifting shaft slidably mounted in the slotted portions of the uprights, connections between said shafts to move the lifting shaft in the slots in the operation of the operating shaft, a conveyer mounted on and operated in the operation of the lifting shaft, a power shaft, and connections supported on the operating shaft and connected with the power shaft to actuate the operating shaft for moving the lifting shaft in the slots or to operate the lifting shaft independently of the operating shaft.

In testimony whereof I affix my signature.

EDWIN W. COOTS.

Copies of this patent may be obtained for five cents each, by addressing the "Commissioner of Patents, Washington, D. C."